Figure 1:
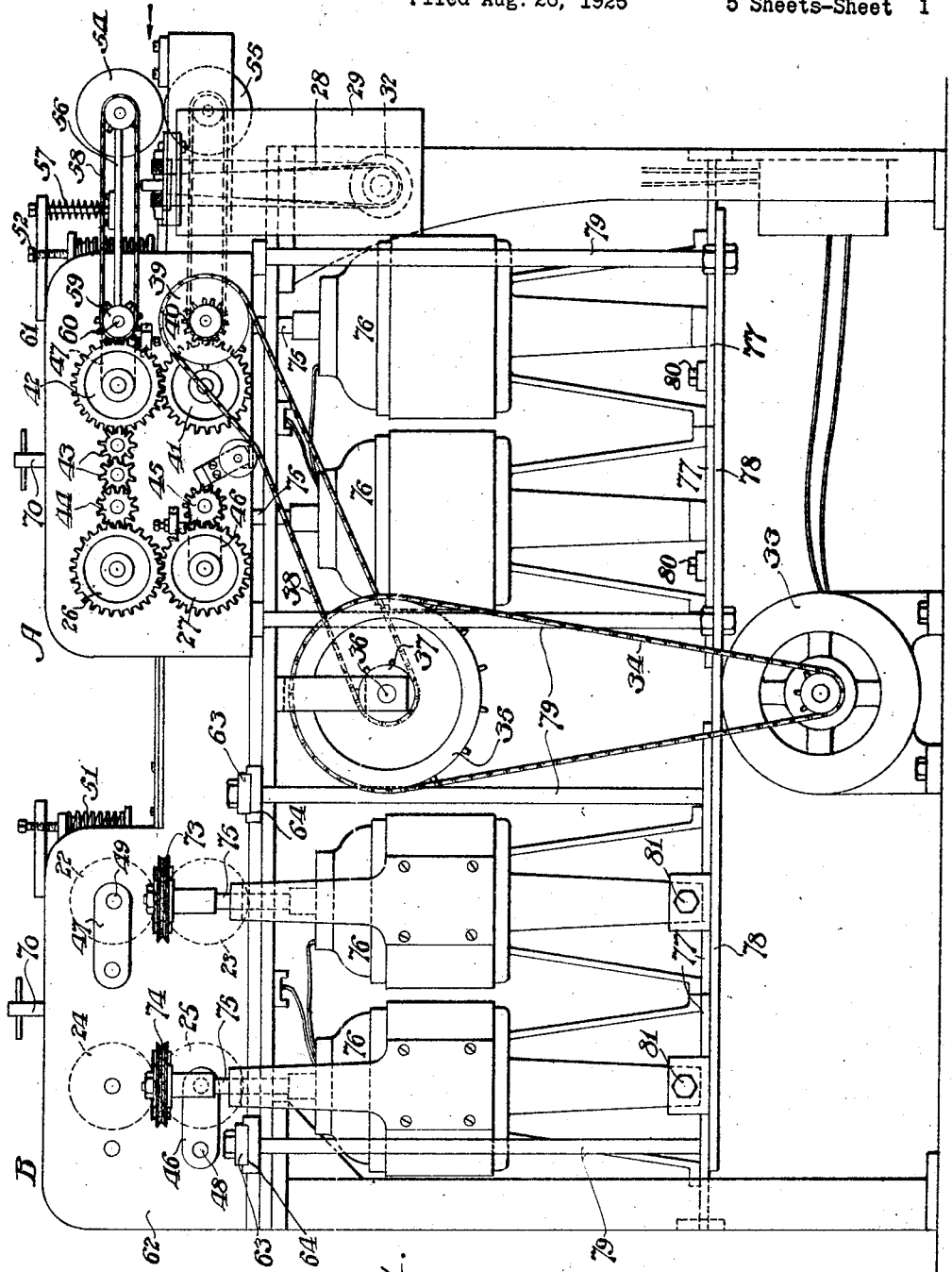

Nov. 27, 1928.

F. C. SIMMONS 1,692,871

EDGE FINISHING

Filed Aug. 26, 1926

5 Sheets-Sheet 1

Inventor:
Frederick C. Simmons,
By M. O'Koonsdale
Attorney.

Nov. 27, 1928.　　　　　　　　　　　　　　1,692,871
F. C. SIMMONS
EDGE FINISHING
Filed Aug. 26, 1926　　　　5 Sheets-Sheet 5

Inventor:
Frederick C. Simmons,
By
Attorney.

Patented Nov. 27, 1928.

1,692,871

UNITED STATES PATENT OFFICE.

FREDERICK C. SIMMONS, OF HIGHLAND PARK, PENNSYLVANIA, ASSIGNOR TO PIONEER SUSPENDER COMPANY, A CORPORATION OF PENNSYLVANIA.

EDGE FINISHING.

Application filed August 26, 1926. Serial No. 131,589.

My invention relates to edge finishing; the object is to provide improved method and means for producing a smooth finish, preferably of rounded cross section, to the edges or side margins of strips, such as strips of leather used in making belts for wearing apparel.

The method and means are preferably applicable to operating on belt straps, from which the corners of the edges or side margins have been removed.

The invention comprises method of and means for moving the strip to be operated upon through a definite path of travel and for operating upon the opposite edges of the strip, while it is in motion, by a plurality of grooved rotating elements having roughened or abrading surfaces, adapted to remove from said edges all projecting fibres resulting especially from the preceding operation of beveling the corners.

The invention comprises also the application of moisture to the edges of the strip before subjecting it to the smoothing process. This moistening medium may have a coloring substance in it, if desired, for coloring the said edges.

The invention includes method and means for adjusting the several elements to varying widths of strips to be operated upon. The invention also includes improvements in details of construction.

Figure 2:
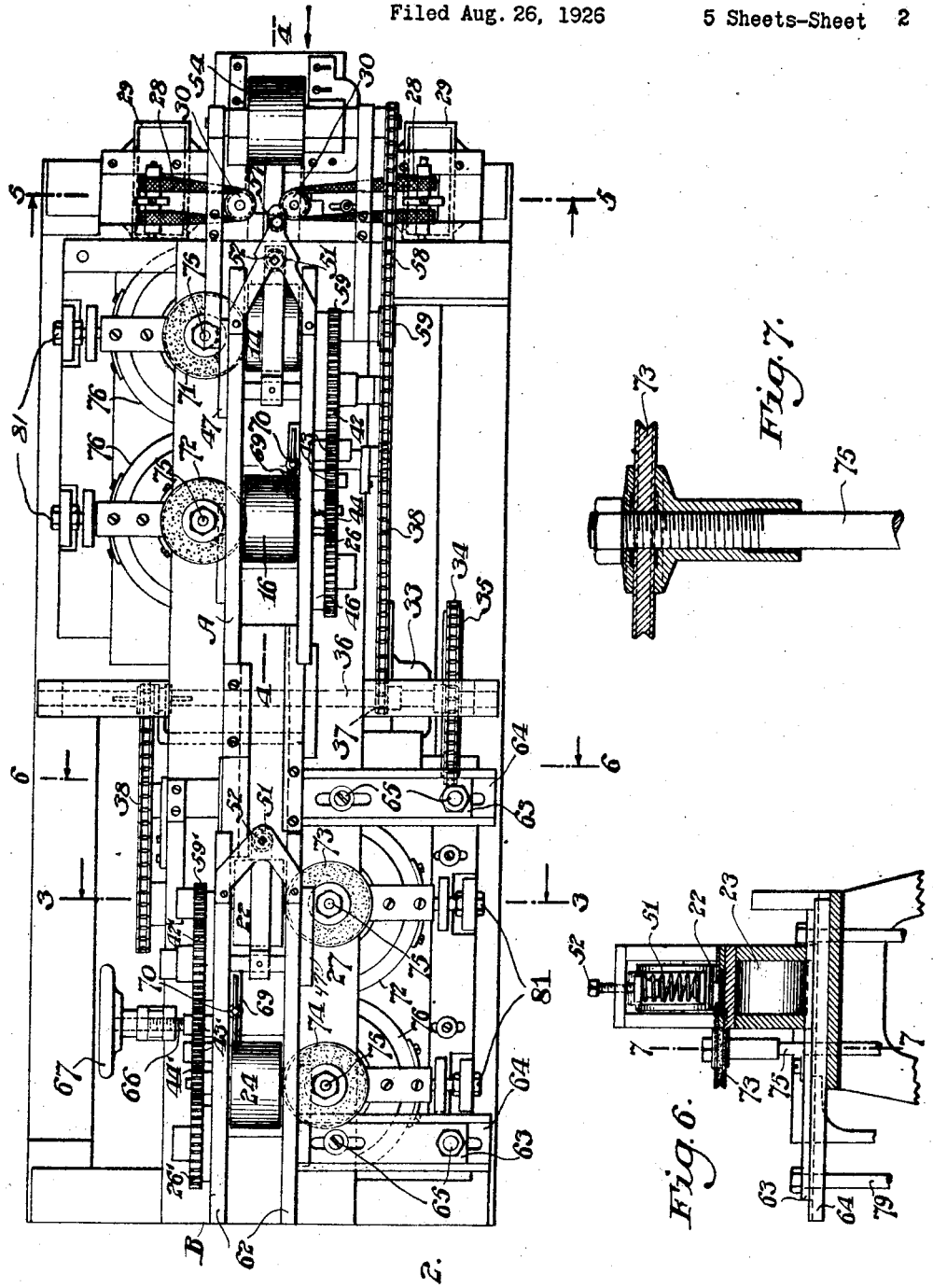
Figure 3:
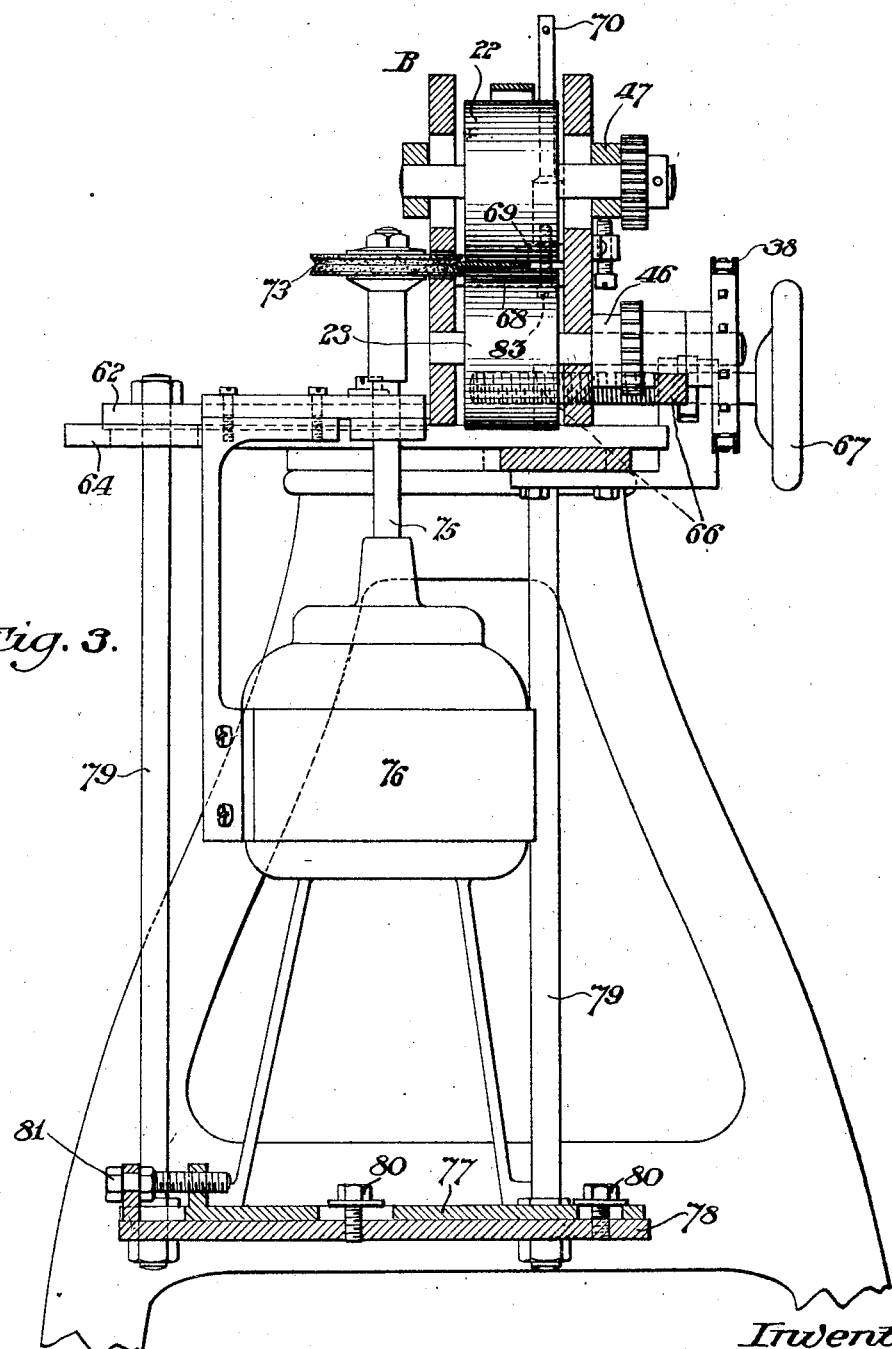
Figure 4:
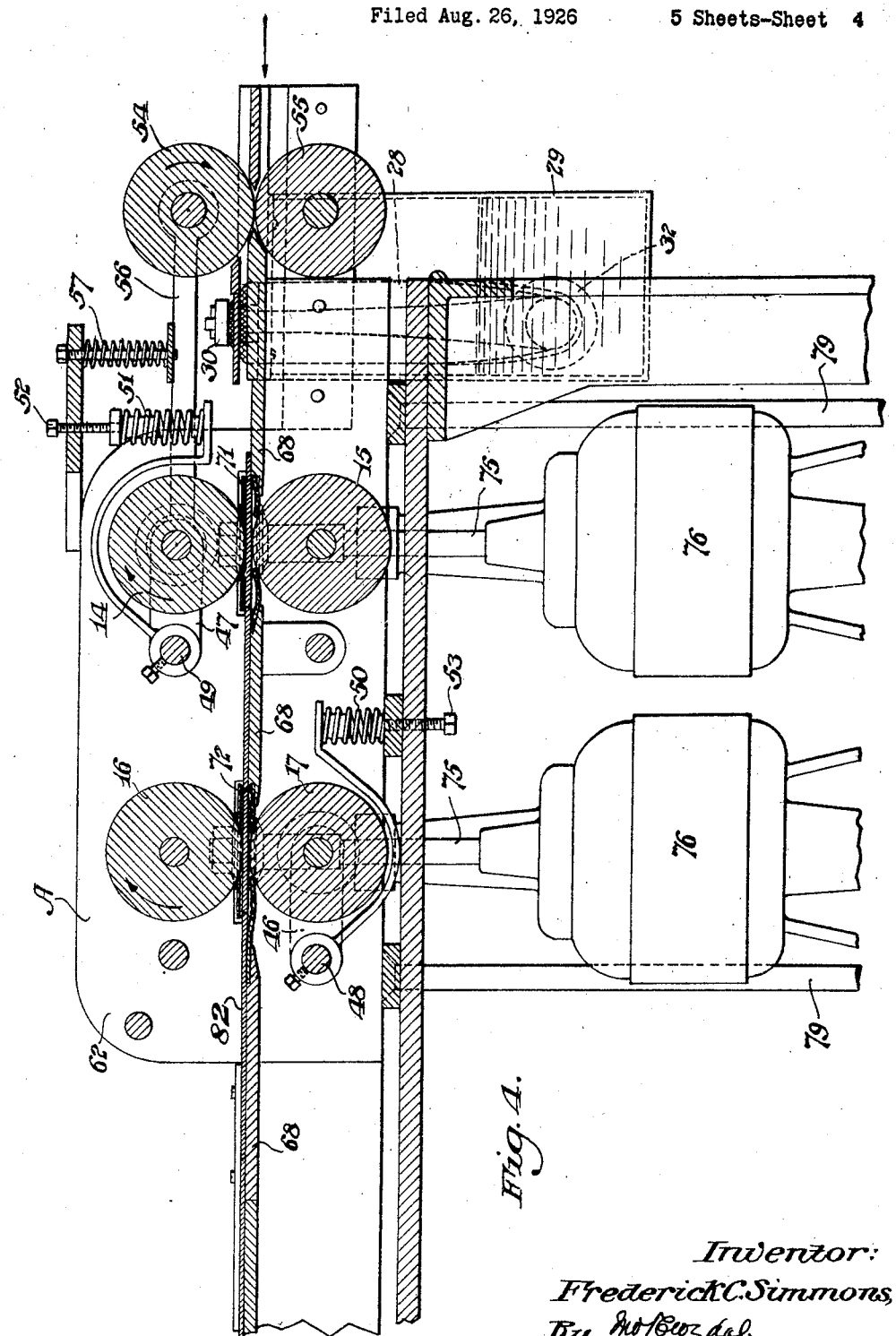
Figure 5:
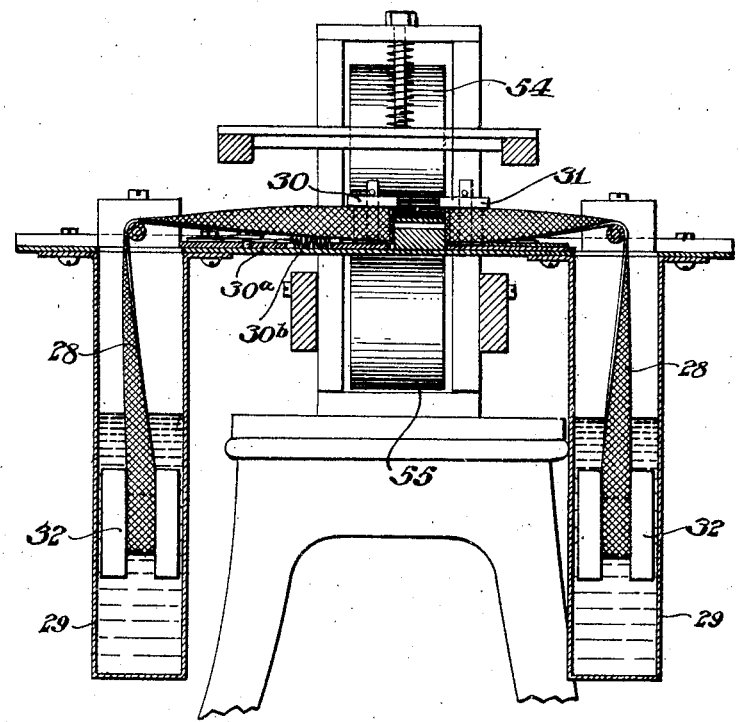
Figure 8:
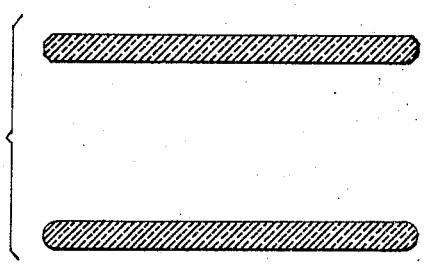
Figure 9:
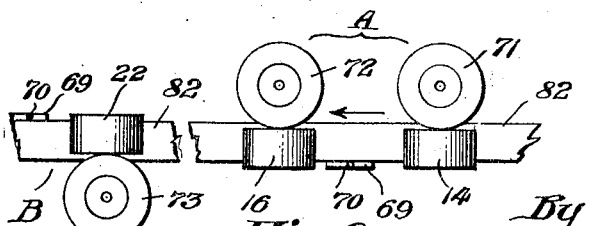

Referring to the drawings, which illustrate merely by way of example, suitable means for effecting the invention:

Fig. 1, is a side elevation.
Fig. 2, is a plan view.
Fig. 3, is a section in line 3, 3, of Fig. 2.
Fig. 4, is a section in line 4, 4, of Fig. 2.
Fig. 5, is a section in line 5, 5, of Fig. 2.
Fig. 6, is a section in line 6, 6, of Fig. 2.
Fig. 7, is a section in line 7, 7, of Fig. 6, on enlarged scale.
Fig. 8, shows cross sections on a magnified scale, of the belt before and after treatment in accordance with the present invention.
Fig. 9 is a fragmentary plan showing the arrangement of feed rollers, abrading elements and gauges with respect to the strip operated upon.

Similar numerals refer to similar parts throughout the several views.

In Fig. 4, are shown two pairs of rollers 14, 15, 16 and 17, one pair in approximate alinement with the other pair. The rollers of each pair are mounted so as to exert spring pressure upon the strip 82 passing between them. These rollers are also power driven to cause the movement of the strip in a definite path of travel, with one edge of the strip projecting beyond one side of two pairs of rollers. Grooved grinding wheels 71 and 72 are mounted on vertical shafts 75, so as to engage the edge of the belt at points adjacent the points of contact with the belt of the two pairs of rollers. This mechanism may be said to comprise one unit A, for operating upon one side of the belt.

Beyond these two pairs of rollers 14 to 17 inclusive, are two other pairs of rollers 22, 23, 24 and 25 of unit B, see Fig. 1, in approximate alinement with the first mentioned rollers, except they are so positioned that the opposite edge of the belt will project on the opposite side of said rollers. The grooved grinding wheels 73 and 74, are similarly mounted and power driven to engage, abrade and smooth the said opposite edge of the belt. This comprises the second unit.

Referring to Fig. 1, the rollers of the first unit A, operate as follows:—

The motor 33 drives, through chain 34 and sprocket 35, countershaft 36 which carries sprocket 37, driving through chain 38, sprocket 39, carrying gear wheel 40. Gear 40 is on shaft of roller 15 and meshes with gear 41. Gear 41 meshes with gear 42, which drives gear 59, on shaft of roller 14. Gear 42 co-operates with chain of gears 43, which communicate movement to gear 44 on shaft of roller 16, and gear 44 communicates movement, through gears 26 and 27, to gear 45 on shaft of roller 17.

The rollers 22 to 25 of unit B, are driven, by similar sprockets, chains and gears, having corresponding reference numbers primed from countershaft 36 on the other side of the machine.

One roller of each pair, for example, rollers 15 and 16, see Fig. 4, are mounted on fixed shafts, while one roller of each pair, as 17 and 14, are mounted on bifurcated levers 46 and 47, fulcrumed at 48 and 49. Pressure is exerted on these levers by springs 50 and 51 respectively. The tension of these springs is controlled by the tension screws 52 and 53.

Additional feed rollers 54 and 55 are provided for feeding the belt to the moistening tapes. The upper roller 54 is mounted on the pivoted lever 56, controlled by the spring 57, and is driven by chain 58 from sprocket 59, mounted on shaft 60, having a gear meshing with gear 42, as above stated.

One unit, for example, unit B, is adjustable laterally with respect to unit A. For this purpose the rollers 22 to 25 are mounted on a frame 62, having extensions 63, adjustably seated in channels 64, and secured by screws and slots 65. The adjustable movement is secured by a suitably mounted screw 66, threaded in a part of frame 62, and operated by hand-wheel 67. This adjustment is for the purpose of operating upon different widths of belt.

Guide plates 68 are positioned between the rollers, and gauges 69, of suitable size to fit the belt operated upon, are secured to plates 68 by means of extension nuts 70.

The guide plates 68 are so positioned and supported in the frame of the machine as to serve as bridges for supporting the belt 82 between adjacent pairs of rollers. In each guide plate is secured the upwardly projecting screw 83. The gauge 69, see Figs. 2 and 9, is of proper width, with respect to the width of the strip 82 operated upon, to maintain the opposite edge in proper engagement with the abrading wheels. The gauge 69 has a hole to receive the end of the screw 83. The elongated nut 70 cooperates with screw 83 to clamp the gauge in position.

Two grinding wheels 71 and 72 are suitably mounted on one side, in unit A, while two grinding wheels 73 and 74 are mounted on the other side, in unit B. These wheels are each mounted directly on a shaft 75 of an independent motor 76. Each of these motors 76 is mounted on a plate 77, which in turn is movably mounted on a base plate 78, secured by rods 79 to the stationary frame of the machine, as shown in Fig. 3.

Plate 77 is adjustably secured to plate 78 by screw and slot means 80. The adjustment of plate 77 and its supported motor and grinding wheel, toward and away from the belt, is secured by the adjusting screw 81.

In order to improve the finish of the belt edges, it is sometimes desirable to moisten said edges before they are operated upon by the abrading wheels. For this purpose endless tapes 28 are caused to move to and from fluid containing receptacles, such as 29, over rollers 30 and 31, against both edges of the belt, so that the fibrous material of the belt will absorb moisture from the moisture carrying tapes. Sufficient tension is maintained on these tapes by weight rollers, such as 32, or other suitable means. The liquid applied to the said belt edges may be in the form of a dye or dressing, which gives the desired color and finish to said edges. The friction of the belt edges against the tapes is sufficient to cause the tapes to travel over the rollers from and back to the liquid tanks. Roller 30 is mounted on a slide plate 30ª controlled by spring 30ᵇ causing yielding engagement of the tapes 28 with the edges of the belt.

In operation, the belt or strip 82 is introduced first between the rollers 54 and 55, see Fig. 1, and engaged as to its edges, with the moistened tapes 28. It then passes between the several pairs of rollers 14 to 17 inclusive of unit A and 22 to 25 inclusive of unit B. In passing between the rollers of unit A, its right hand edge, looking in direction of the travel of the belt, which is from right to left in Fig. 2, and Fig. 9, project beyond the sides of the rollers, is encountered by the abrading and smoothing wheels, first 71 and next 72, while in passing between the rollers of unit B the left hand edge of the belt projects beyond the sides of the rollers to be encountered by the abrading wheels 73 and 74. The gauges or guides 69 cooperating with the rollers to maintain said edges firmly against said abrading wheels.

The abrading wheel are rotated so that their peripheries move in direction opposite to the direction of travel of the belt.

It is preferable to have two abrading wheels operating upon each edge of the belt for two reasons. First: As the belt is constantly moving, the peripheral engagement, or abrading action of one wheel upon any single point of the belt edge is limited, so that by using two wheels on the same side edge the abrading action is doubled. Second: It has been found that the first abrading wheel, as for example 71, may be of coarser grain to remove the projecting feathers, or rougher parts from the belt edge, while the second wheel, for example 72, may be of finer grain in order to give a smoother finish. This method of operation may be called abrading in stages, or progressively.

What I claim is:

1. In an edge finishing machine the combination of a plurality of pairs of cooperating feed rollers for causing the movement of a strip of fibrous material in a definite path of travel, said pairs of cooperating rollers arranged in groups, so that one side edge of the strip will project laterally from the side margins of one group and the other side edge of the strip will project laterally from the side margins of another group, abrading elements operating upon the said side edges of the strip adjacent the cooperating pairs of rollers beyond which the side edges project and means for adjusting laterally one group of cooperating rollers with respect to another to suit the width of the strip operated upon.

2. In an edge finishing machine the combination of a plurality of pairs of cooperating feed rollers arranged in groups for causing the movement of a strip in a definite path of travel, one side edge of the strip projecting from the side margins of the rollers of one group and the other side edge projecting from the side margins of the rollers of the other group, abrading elements operating upon said projecting side edges of the strip adjacent said pair of cooperating rollers, a motor and spindle for supporting and rotating each abrading element and means for adjusting the position of each motor to suit the width of the strip to be operated upon.

3. In an edge finishing machine the combination of means for moving a strip, such as leather, in a definite path of travel, means comprising moistening tapes for moistening the side edges of the strip, and a plurality of rotating abrading elements for engaging the moistened edges of the strips during said movement.

4. In an edge finishing machine the combination of a plurality of pairs of co-operating rollers for causing the movement of a strip, such as leather, said cooperating pairs of rollers arranged in groups and said groups so positioned in approximate alinement but so as to permit one side edge of the strip to project to one side of one group, and the other side edge to project to the other side of another group, and rotating peripherally grooved abrading elements for engaging said projecting side edges adjacent the cooperating rollers from which they project.

5. In an edge finishing machine the combination of a plurality of pairs of co-operating rollers for causing the movement of a strip, such as leather, so positioned in substantial alinement as to permit one side edge to project to one side of certain rollers, and the other side edge to project to the other side of other rollers, interchangeable gauges co-operating with the rollers for guiding and supporting the strip and rotating peripherally grooved abrading elements for engaging said projecting side edges adjacent the rollers from which they project.

6. In an edge finishing machine the combination of a plurality of pairs of co-operating rollers for causing the movement of a strip, such as leather, so positioned in substantial alinement as to permit one side edge to project to one side of certain rollers, and the other side edge to project to the other side of other rollers, rotating peripherally grooved abrading elements for engaging said projecting side edges adjacent the rollers from which they project and moistening tapes moving in contact with said side margins.

7. In an edge finishing machine, the combination of means for automatically moving strips of fibrous material in a straight line path of travel, comprising a plurality of pairs of power driven, spring pressed co-operating feed rollers, means for abrading the side edges of said strips, comprising power driven abrading wheels, each abrading wheel having its axis at right angles with and intersecting the projected axes of a different closely adjacent pair of feed rollers, said strips projecting, as to one side only, beyond the side margins of said pair of feed rollers to engage the adjacent abrading wheel, and an independently adjustable motor for supporting and driving each abrading wheel.

8. In an edge finishing machine, the combination of means for automatically moving strips of fibrous material in a straight line path of travel, comprising a plurality of pairs of power driven, spring pressed co-operating feed rollers, means for abrading the side edges of said strips, comprising power driven abrading wheels, each abrading wheel having its axis at right angles with and intersecting the projected axes of a different closely adjacent pair of feed rollers, said strips projecting, as to one side only, beyond the side margins of said pair of feed rollers to engage the adjacent abrading wheel, and means for causing the edges of the strips to absorb a fluid medium before reaching the first abrading wheel.

FREDERICK C. SIMMONS.